(12) United States Patent
Reeves

(10) Patent No.: US 6,487,462 B1
(45) Date of Patent: Nov. 26, 2002

(54) SELECTIVE PROCESS DATA LOGGER WITH INSTANT REPLAY

(76) Inventor: G. George Reeves, 3324 Octavia St., Raleigh, NC (US) 27606

( * ) Notice: Subject to any disclaimer, the term of this patent is extended or adjusted under 35 U.S.C. 154(b) by 0 days.

(21) Appl. No.: 09/490,176

(22) Filed: Jan. 22, 2000

(51) Int. Cl.[7] .............................................. G05B 21/02
(52) U.S. Cl. .............................. 700/73; 702/6; 702/187
(58) Field of Search ........................ 700/2, 73, 6, 127, 700/187

(56) References Cited

U.S. PATENT DOCUMENTS

| | | | | |
|---|---|---|---|---|
| 4,910,692 A | * | 3/1990 | Outram et al. | 702/187 |
| 5,056,056 A | * | 10/1991 | Gustin | 702/187 |
| 5,319,580 A | * | 6/1994 | Sakata et al. | 702/185 |
| 5,754,449 A | * | 5/1998 | Hoshal et al. | 702/187 |
| 6,275,783 B1 | * | 8/2001 | Okamura | 702/187 |
| 6,285,955 B1 | * | 9/2001 | Goldwasser | 702/6 |

* cited by examiner

Primary Examiner—Thomas Black
Assistant Examiner—Ronald D Hartman, Jr.

(57) ABSTRACT

This is a system to record process data only when it has changed enough to be significant to the process being controlled and monitored. Unlike conventional fixed interval data loggers it does not miss a significant event which occurs between fixed time interval data sets. Neither does it fill its memory with repetitive constant data values. The time for data recording is determined by the process behavior and not known in advance. For this reason the time at which a data set was recorded is included within it. This system has a clock calendar, non-volatile memory, microprocessor control, and data replay and display capability. Data can be replayed on the included display using simple reverse and forward buttons to sequentially scan through data records in the non-volatile memory just as if it were a tape recording. A system can be incorporated into process controls to substantially increase their utility.

20 Claims, 2 Drawing Sheets

SELECTIVE PROCESS DATA LOGGER WITH INSTANT REPLAY

BACKGROUND—FIELD OF INVENTION

This invention relates to process controls, the collection of process data, maintenance of a process data archive, and easy access and display of the data when and where needed.

BACKGROUND

Industrial processes often use automatic controls to reduce costs, improve quality, and increase productivity. When process difficulties are encountered or improvements are needed it is necessary to obtain reliable data on previous process history for analysis or diagnosis. This can be difficult to do since the industrial environment is often hostile and damaging to data collection equipment. Customarily persons wanting process data attach data logging equipment to the process. Sometimes the automatic controllers make provision for external data logging attachments. Data loggers record data at some fixed periodic rate. The user must choose an appropriate sample rate to collect the desired data. If he wants to know about some action which occurs for a few seconds, he might sample at a once per second rate. Many of the data points will be uninteresting since they occur between the desired process events under study. Most of the recorded data may simply report that nothing has changed. The available memory can be filled quickly with uninteresting data. Sometimes a specific predetermined event such as machine startup is used to start or stop data collection in an attempt to collect only relevant data. It is difficult to predetermine which events will always cause the important data to be collected. The process failures of interest are by their nature typically random and unpredictable. A further difficulty with data loggers is that they often have to be taken somewhere away from the process to have their contents read and analyzed. This procedure prevents the data from being immediately available for diagnostic procedures at the process under control.

Another disadvantage of conventional data logging is that the user must anticipate the need for the process data and have the data logger working before the critical data occurs. Often it is unknown when a process will have a problem and data is not collected at the critical time. A further disadvantage with conventional data logging is that manual handling can result in data loss or corruption.

Another approach to the process data collection problem is to control the process with a full general purpose computer with extensive data storage and data backup capability. The hostile factory environment makes it difficult and expensive to isolate and protect the expensive computer components if it is conveniently located near the process being controlled. If the computer is located some safe distance from the process then the needed data will also be some distance away.

OBJECTS AND ADVANTAGES

It is the object of the present invention to simply and economically add selective process data logging to process controls and provide a way to instantly replay desired process data on the at the process site. Since the data collection is incorporated within the controller it is possible to configure it to collect data selectively and record only when there has been some change in the process. Only significant process events are recorded and memory space is not wasted recording uninteresting repetitive data. This economic use of storage can permit several months of data to be stored within the controller in a relatively modest size memory. Another advantage is that the process event storage is always connected and active when the controller is on. This guarantees that if some unexpected process event occurs, it will be recorded. A very troublesome unexpected process event is the intermittent failure which occurs, ruins product, and then disappears spontaneously. Without a continuous record of process changes it can be extremely difficult to locate and fix the source of such failures. Further, since the data storage is within the controller and not external to it; tamper resistance and security are improved compared to a conventional external data logger. Further, since only a modest addition to the usual rugged process controller is needed, the expense and complexity associated with a full general purpose computer is avoided.

DRAWINGS

DESCRIPTION

Figure 1:
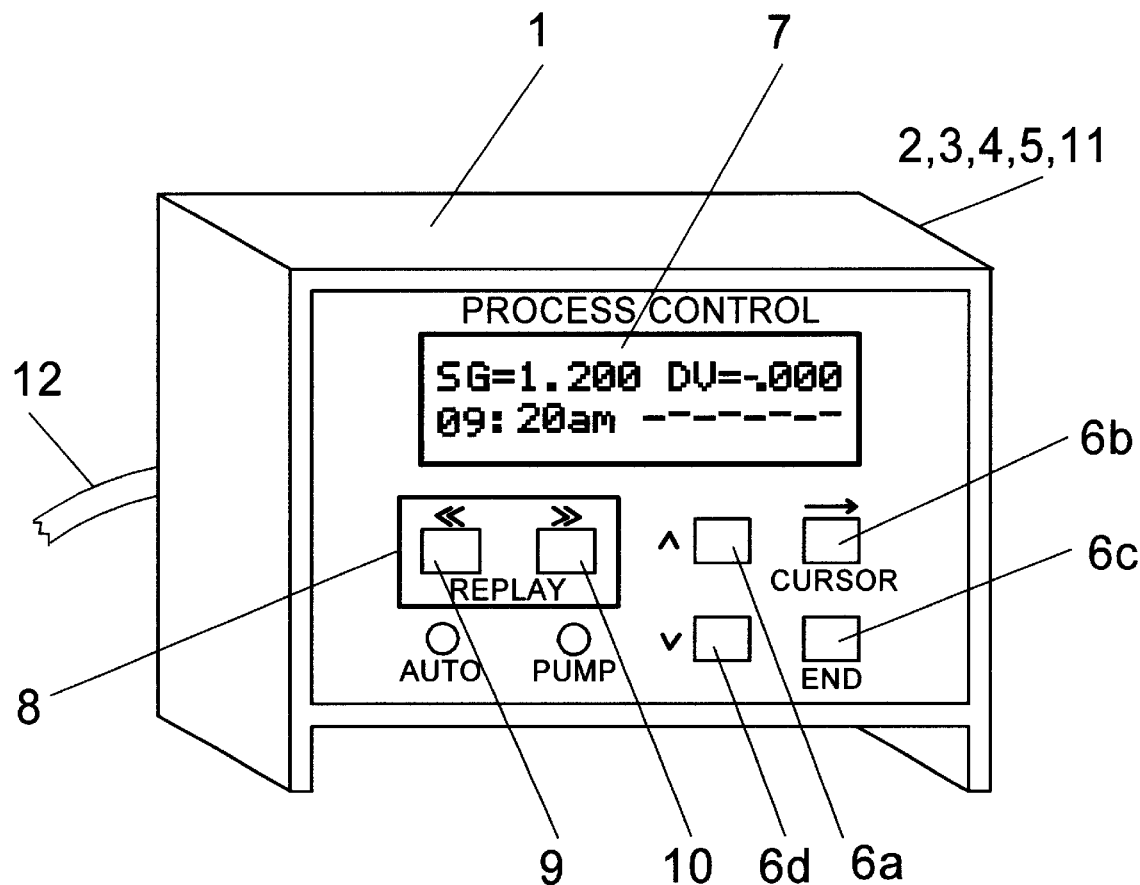
FIG. 1 shows a perspective view of a process controller with selective process data log and instant replay.

The FIG. 1 shows a typical embodiment of a process control with the features of this invention. The case 1 would typically be a rugged and resistant to the environmental stresses surrounding the controller. These could typically include dust, moisture, oil, and of corrosive vapors and liquids. Inside the case is a microprocessor 2 which does computations and logical operations for the controller and data logging functions. The microprocessor would typically have its own small random access memory. Also inside the case is the program memory 3 which would typically be non-volatile memory such as PROM or EPROM memory. The program memory contains the instructions for the microprocessor to control the process, create displays, and store and retrieve process data. Also inside the case is a non-volatile process data memory 4 such as EEPROM, two or more blocks of flash memory, or battery-backed static RAM. It is important that both the program and process data memories be non volatile to retain their contents when the power to the controller is off. The process data memory also needs to be electrically erasable so that part of it can be erased and reused when it fills up with process data. A clock-calendar 5 is also contained within the case to supply time and date information within process data sets. The case also contains a data interface 11 to allow stored process data to be transferred for external analysis should that be desired. Cable 12 brings data to the controller from process sensors and carries control signals back to the process.

Figure 2:
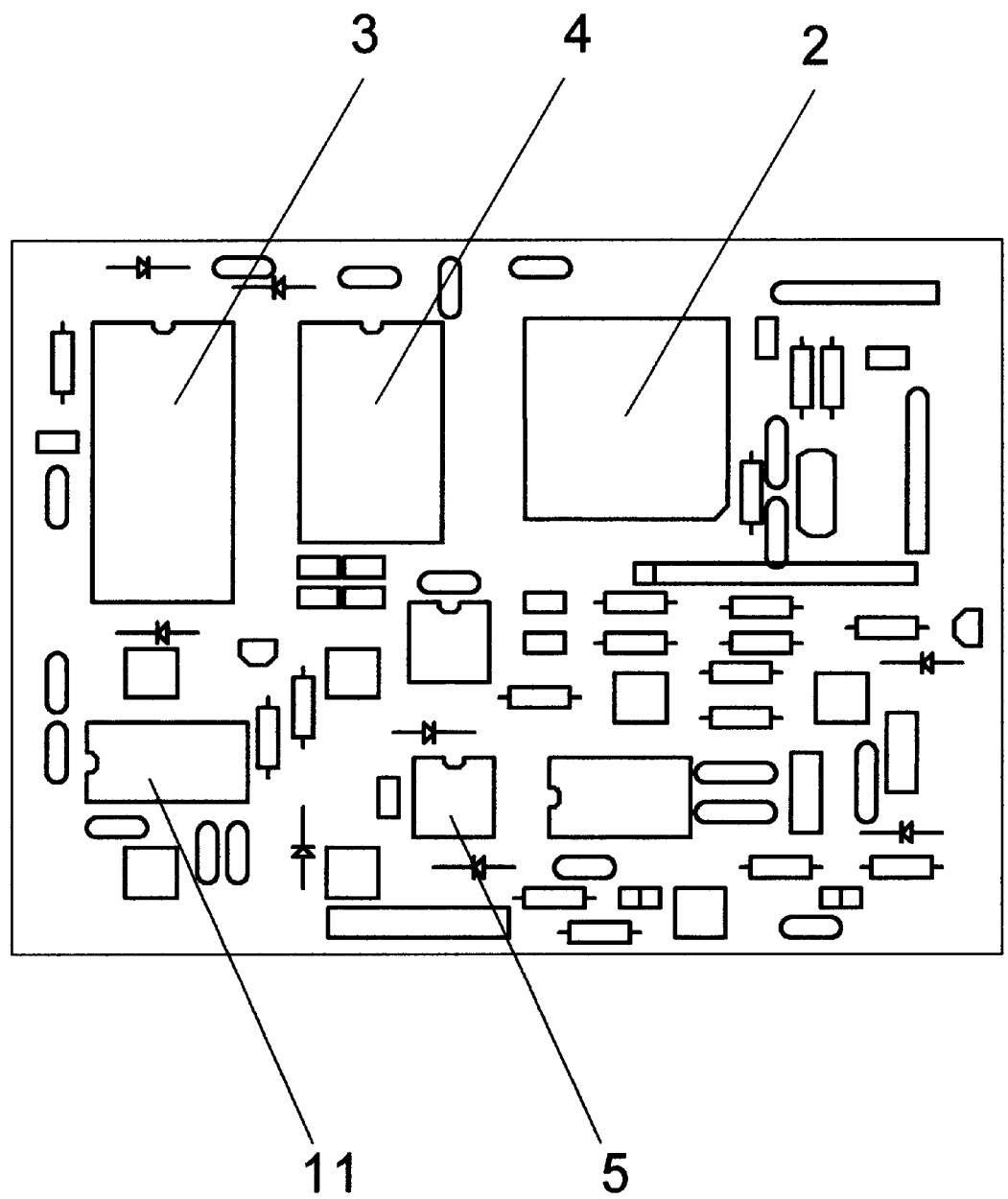
FIG. 2 shows the components internal to the controller case.

FIG. 2 shows the components internal to the controller case mounted on an etched circuit board which provides the required electrical interconnections.

There are many possible choices for the parts within the case shown in FIG. 1 as is known by those skilled in the art. In one particular embodiment which has been built and tested the microprocessor 2 is a Motorola 68HC11, the program memory 3 is EPROM, the process data memory 4 is a sixteen block Intel flash memory, and the data interface 11 is a standard RS232 serial port.

The operator's buttons 6 allow the user to set up the control and adjust operating parameters. The display 7 is used to inform the operator of process parameters and also will replay data from the process data memory. In the particular embodiment shown in FIG. 1 the top line displays process data. The left end of the lower line alternately displays the date and time stored in a clock-calendar. The right half of the lower line displays data from the eight most recent data sets store in the process data memory. In the particular embodiment shown the eight values displayed are past values of the deviation shown on the right end of the upper display line. The deviation shown is the error away from the desired process control point. On the eight data point display a bar in the middle of the line represents a zero deviation, the distances of bars above and below the middle represent progressively larger positive and negative deviations respectively. The replay controls 8 are used to control the system in the replay mode. Touching reverse button 9 will cause the display to show past process data along with the date and time at which the data was collected. In the particular embodiment shown process data is shown on the top line of the display while date and time are shown on the bottom line along with control logical state data. Touching the reverse button 9 momentarily causes data to replay in reverse toward progressively earlier times. Each time the button is pressed the replay rate increases. If the reverse button is held down continuously a display goes into a fast rewind mode in which data points are skipped to move rapidly through the archived data sets. Similarly pressing the forward button 10 momentarily causes a replay in the forward direction. Successive button presses speed the replay. Holding the button down continuously causes a fast forward mode. Touching the END button 6c in the operator's buttons 6 ends the instant replay mode and puts the control back in its normal behavior.

OPERATION

In order to describe the operation of this invention it is first necessary to discuss the properties of the flash memory used as non-volatile process memory 4 in the embodiment shown in FIG. 1 and how those properties interact with the details of the data sets recorded. Each of the sixteen blocks in the flash memory has 65,024 usable bytes of memory. Each process data set is to be recorded as ten bytes of information. Thus there are 6,502 available archive addresses at which data sets can be started in each block of the flash memory. The first archive address would be 0; the next archive address would be 10, followed by address 20 and so on through 65,010. Each byte of flash memory can be written independently. Once a byte has been written to an address then that address cannot be written to again until the entire block it is in has been erased. Block erasure sets all the bits in the block to logical one. Data is recorded by selectively writing bits to logical zero. The first bit of each data set is a logical zero to securely indicate that a particular archive address has been written. It will thus be necessary for the microprocessor 2 to erase a block and make it available for data storage before any of the bytes in can be used for current data.

The discussion below describes actions performed by the microprocessor 2 and its program in response to process information and button press inputs from an operator. These described actions teach a person skilled in the art the program specifications necessary to create such a system.

There are three distinct modes of operation for the particular embodiment in FIG. 1. These are normal, setup, and replay. Each of these will be discussed in turn starting with the normal mode. At power-on startup the microprocessor 2 resets itself and memories 3, 4 and begins reading program commands from the program memory. The program initializes the display 7 and begins searching flash memory 4 for the current block which can be written to. It searches by looking for a flash memory block which has all logical ones at the first position of all archive addresses from some point in the block until its end. The lowest archive address whose data has a logical one in the first position is the next available archive address in the block. The microprocessor 2 then stores this next available archive address into its internal RAM.

In normal operation the embodiment shown in FIG. 1 receives information from a specific gravity sensor which measures deviation from the desired control point. It turns on a chemical supply pump whenever the deviation is positive. It displays deviation on the display 7 and adds a user supplied calibration value to deviation to get the specific gravity and displays that value. If the deviation exceeds the user-set tolerance an alarm is turned on. A user can press the END button 6c to cancel the alarm for a five minute interval to fix the problem causing alarm. The unit monitors whether the chemical feed pump is powered in the automatic or manual override condition. It monitors whether the alarm is on and monitors whether the alarm cancel is activated. All of this data is archived in a data set stored at the next available archive address right after power-on initialization. The address used is the one previously stored in RAM during the initialization procedure. The archive address is then incremented by ten to prepare for the next data set storage. Whenever the process data detected by the unit is significantly different from the last data stored, a new data set is stored and the archive address is again incremented by ten. Significance in this case means that the difference detected is greater than a threshold value large enough to be important to the process controlled. In some cases it may be desirable to make the threshold value of parameter which can be increased if an excessively large number of process data sets are being collected. In some cases it may also be desirable to delay sample collection immediately following a control event which introduces a noisy transient into the system. When the archive address reaches 64,910 the microprocessor examines the next block of flash memory to see if that block has been flash erased and made ready for data recording. If the next block needs erasure that is done. If the next block has already been erased of then nothing is done to it. Thus the system has ten chances to make the next block available for data recording before the current block is used up.

The flash memory block control scheme erases and overwrites the oldest data block stored once the memory has been filled the first time. To the user it appears to function as if it were an endless loop tape recorder. At least two independently erasable flash memory blocks are required to achieve this loop recording feature with flash memory.

The operator can enter the setup mode by simultaneously holding down the up 6a and down 6d buttons while pressing and releasing the cursor button 6b. The operator then has access to screens which allow him to set parameters. Each screen has an instructional line at the top of the display 7 with the parameters to be set shown on the bottom line. The cursor button 6b is used to select which parameters are to be adjusted. The up button 6a increases and the down button 6d decreases the numerical value of the parameter selected. Placing the cursor at the extreme left end of the bottom of line of the display 7 lets the up button 6a and down button 6d move between parameter screens. These screens let the user set units to be displayed, enter calibration values, set the clock and calendar, and choose the sensitivity of that eight point data display. Pressing the END button 6c exits the setup mode and returns to normal mode.

From normal mode the replay mode is entered by touching the reverse replay button 9. The display stops showing process data and begins showing past process data records which have been stored in an non-volatile process data memory. The reverse button signals the microprocessor to move through data records in sequence starting from the most recent record and moving toward the past. The data scan is very efficient since only changing data has been recorded. Time intervals when variables stayed constant are automatically skipped over since there are no data sets for them. The forward button signals the microprocessor to start from the current displayed record and move through data records in sequence from the past and toward the present time. Initially the records are displayed at approximately a one per second rate. Repeated button presses speed the scan and display process. After six button presses in the same direction the maximum scan rate is reached. When the addresses being scanned reach the end of a block the system increments to the next block. If forward scan reaches the end of block fifteen then the next block scanned is block zero. If reverse scan reaches the end the block zero and the next block is block fifteen. If a replay button is held down continuously the record scanning goes into fast forward or fast reverse. In fast forward or fast reverse one record is displayed at the maximum speed and then the next four records are skipped to rapidly move through the stored process data. The scan speed adjustment features allow the operator to rapidly move to the date and time containing the data of interest. If the system is scanning in the reverse direction and the forward button 10 is pressed a scan stops, freezing the display. Likewise if the system is scanning in the forward direction and reverse button 9 is pressed the scan stops, freezing the display. Scanning stops automatically when the addresses being scanned enter a region of flash memory which has not yet been written to. Thus the reverse scan stops automatically at the oldest available process data set. Forward scan stops automatically at the most recently recorded data set. To the operator these forward and reverse functions appear to operate like a familiar tape recorder. This simplifies operator training.

In the particular embodiment shown in FIG. 1 the information displayed during a scan mode is simultaneously transmitted from the data interface 11. The data interface in this case is a simple RS232 serial port. The transmitted data is formatted as a simple text file to make it easy to download into nearly any computer. The data in the text file can either be read directly or it can be transferred to spreadsheets and other analysis programs. The transferred data can also be permanently stored in a warehouse if that is desired.

In the particular embodiment shown in FIG. 1 the non-volatile process data memory contains over 100,000 archive addresses. It is thus capable of retaining over 100,000 process data records. If, for example, a process generates 200 process events to be stored per hour of operation it would take over 60 days operating eight hours per day to fill the process data memory.

The scan mode is exited when the operator presses the END button 6c returning the system to the normal mode. The scan mode can also be exited automatically if the display stops changing for several minutes because the end of the data sets has been reached. Or, the scan mode can be exited automatically if no devices are connected to the data interface 11 and neither of the replay buttons 8 have been pressed for several minutes.

SUMMARY, RAMIFICATIONS, AND SCOPE

As can be seen from the above teachings anyone skilled in the art can use them to create a process controller which is superior to those heretofore available. Among its numerous advantages are it collects process a day of any time it is controlling the process;

it displays the most recent data points while it controls;

past process data from some significant past time are immediately available for display on the controller;

process data is easily transferable for analysis, display, or long term record keeping; and the replay procedure is easily learned by the operator.

Although the description above contains many specificities, they should not be construed as limiting the scope of the invention but merely providing examples of a presently preferred embodiment of this invention. For example, EEPROM or battery backed RAM could be used for non-volatile memory; the microprocessor controlling process data memory recording and playback could be integrated within the memory chip; a graphics display could be substituted for the two line alpha numeric display shown; a different arrangement of buttons might be used or; a voice command or touch screen might be substituted for user buttons. If the process data logger is put in a separate box outside the controller it would be essentially the same as the invention outlined in the preferred embodiment. It would simply acquire the data by tapping on to the data input lines into the controller. Also, the display might be a separate unit shared among several selective process data logging units.

Thus the scope of the invention should be to determined by the appended claims and their legal equivalents, rather than by the examples given.

What is claimed is:

1. A process controller with an automatic selective process data logger capable of instant replay comprising:

(a) a process controller receiving process data from sensors;

(b) a non-volatile memory;

(c) a time keeping means;

(d) one or more microprocessors programmed, configured and connected to determine whether the present process data differs significantly from the last previous data recorded in said non-volatile memory;

(e) one or more microprocessors also programmed, configured and connected to automatically store in said non-volatile memory the then current time and process data when said data differs significantly from the last data previously stored in said non-volatile memory;

(f) one or more microprocessors also programmed, configured and connected to replay process data stored in said non-volatile memory;

(g) a display means to show replayed data; and (h) an operator control means to control process data replay.

2. The selective process data logger capable of instant replay of claim 1 wherein said non-volatile memory is flash memory comprising:

(a) at least two independently erasable blocks; and (b) flash erasure controlling means adapted to erase a block of memory whereby an erased block is available for data storage when the block currently being written to is full.

3. The process controller with the selective process data logger capable of instant replay of claim 1 wherein said operator control means is two or more buttons.

4. The process controller with the selective process data logger capable of instant replay of claim 1 wherein said non volatile memory is EEPROM.

5. The process controller with the selective process data logger capable of instant replay of claim 1 wherein said non-volatile memory is battery backed RAM.

6. The process controller with the selective process data logger capable of instant replay of claim 2 wherein said operator control means is two or more buttons.

7. The process controller with the selective process data logger capable of instant replay of claim 6 wherein said display means is a display capable of showing at least two lines of alpha-numeric data.

8. The process controller with the selective process data logger capable of instant replay of claim 1 wherein said operator control means is a touch screen.

9. The process controller with the selective process data logger capable of instant replay of claim 1 wherein said operator control means is voice recognition.

10. A selective process data logger comprising:
    (a) data input means;
    (b) a non-volatile memory;
    (c) a time keeping means;
    (d) one or more microprocessors programmed, configured and connected to determine whether the present process data differs significantly from the last previous data recorded in said non-volatile memory;
    (e) one or more microprocessors also programmed, configured and connected to automatically store in said non-volatile memory the then current time and process data when said data differs significantly from the last data previously stored in said non-volatile memory;
    (f) one or more microprocessors also programmed, configured and connected to replay process data stored in said non-volatile memory;
    (g) a display means to show replayed data; and
    (h) an operator control means to control process data replay.

11. The selective process data logger capable of instant replay of claim 10 wherein said non-volatile memory is flash memory comprising:
    (a) at least two independently erasable blocks; and
    (b) flash erasure controlling means adapted to erase a block of memory whereby an erased block is available for data storage when the block currently being written is full.

12. The selective process data logger capable of instant replay of claim 10 wherein said operator control means is two or more buttons.

13. The selective process data logger capable of instant replay of claim 10 wherein said non volatile memory is EEPROM.

14. The selective process data logger capable of instant replay of claim 10 wherein said non-volatile memory is battery backed RAM.

15. The selective process data logger capable of instant replay of claim 11 wherein said operator control means is two or more buttons.

16. The selective process data logger capable of instant replay of claim 15 wherein said display means is a display capable of showing at least two lines of alpha-numeric data.

17. The selective process data logger of claim 10 wherein said display means is separate and can be disconnected from the remainder of the selective process data logger.

18. The selective process data logger capable of instant replay of claim 10 wherein said operator control means is a touch screen.

19. The selective process data logger capable of instant replay of claim 10 wherein said operator control means is voice recognition.

20. The selective process data logger capable of instant replay of claim 10 wherein said display means is external to case containing said data memory whereby said display can be shared by multiple data loggers.

* * * * *